Figures 1, 2:
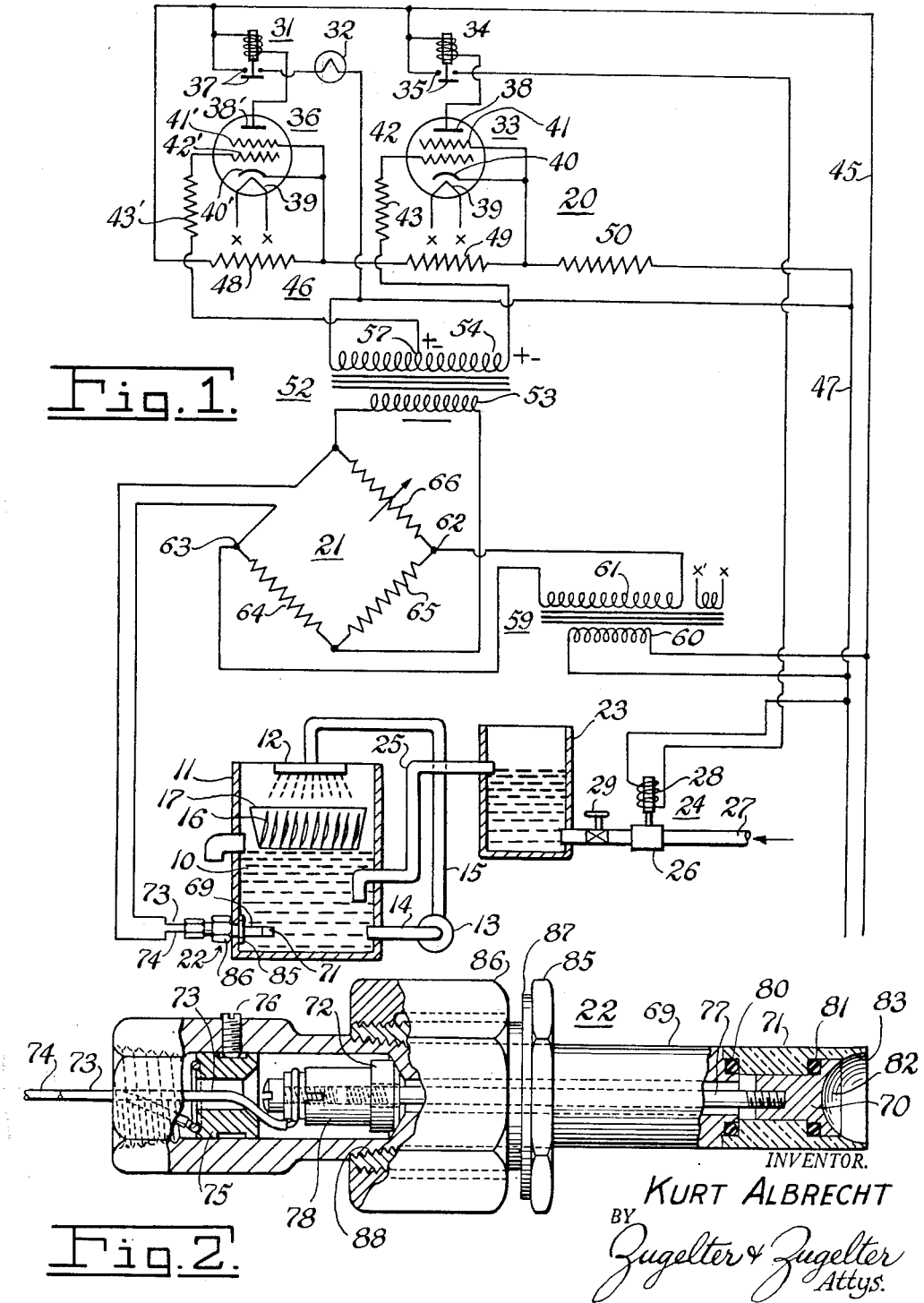

April 22, 1952

K. ALBRECHT

2,593,825

CONDUCTIVITY CONTROLLED DISPENSER

Filed Sept. 29, 1948

INVENTOR.
KURT ALBRECHT
BY Zugelter & Zugelter
Attys.

Patented Apr. 22, 1952

2,593,825

UNITED STATES PATENT OFFICE 2,593,825

CONDUCTIVITY CONTROLLED DISPENSER

Kurt Albrecht, Pleasant Hills Borough, Pa., assignor to Hall Laboratories, Inc., Pittsburgh, Pa., a corporation of Pennsylvania Application September 29, 1948, Serial No. 51,664

9 Claims. (Cl. 137—78)

1

This invention relates to chemical dispensers, and more particularly to dispensers for automatically controlling the feed of chemical to a solution in accordance with deviations in the conductivity of the solution from predetermined values.

The automatic dispenser or feeder embodying the invention herein shown and described, is designed to so control the feed of an alkaline detergent to a cleaning or washing machine such as mechanical dishwashers employed by hotels, restaurants, and institutions, that the concentration of the solution in the machine is maintained within predetermined values. The values of concentration should not be too high as that is wasteful, and often leads to unsatisfactory results because of the excess of detergent, nor too low, as this will result in poor cleaning results. While the dispenser or feeder as designed is particularly suitable to the controlled feeding of alkaline detergents, its applicability to the controlled feeding of other chemicals and for other purposes will also be apparent.

An object of this invention is to provide a feeder of the character referred to above that shall operate in response to the electrical conductivity of the solution whose concentration is to be controlled.

Another object of the invention is to provide a dispenser of the type referred to above in which a Wheatstone bridge operating on alternating current and having in one of its branches a conductivity cell immersed in the detergent solution is employed to control a gas filled tube having a feed controlling relay in its plate circuit that is energized or de-energized in accordance with the conditions of balance or unbalance of the bridge.

A further object of the invention is to provide a dispenser as set forth above in which this feed controlling relay is energized when the concentration of the controlled solution falls to a predetermined low value, and an alarm relay that is energized by another gas filled tube responsive to the Wheatstone bridge unbalance corresponding to a still lower concentration of the controlled solution, for indicating either that the feeder is inoperative or the supply of the dispensed chemical has been exhausted.

And a still further object of the invention is to provide a dispenser of the type above referred to, that shall be so constructed that its accuracy and reliability may be reproduced in feeders manufactured in quantity production.

These and other objects of the invention will

2 be apparent to those skilled in this art from the following description taken in conjunction with the accompanying drawings, in which:

Figure 1 is a more or less diagrammatic view of a dispenser arranged and constructed in accordance with an embodiment of the invention; and Fig. 2 is a view in section of a conductivity cell embodied in the apparatus of Fig. 1.

In Fig. 1 of the drawings an automatic dispenser is illustrated for feeding automatically a chemical to an aqueous solution 10 in such amounts that the concentration of the solution is maintained substantially constant at a predetermined value. For convenience solution 10 will be referred to as the controlled solution.

By way of explanation solution 10 may be regarded as an alkaline detergent of the type commonly employed in mechanical washers, for example dishwashing machines. Thus I have illustrated schematically the washing compartment of a mechanical dishwasher at 11 having therein the controlled detergent solution 10. A spray or wash arm is shown at 12 through which the solution is forced under pressure by a pump 13. Pump 13 has its intake 14 connected to solution 10 and its outlet 15 to the wash arm 12. The wash arm directs the solution as a strong spray onto dishes 16 carried in a rack 17, as the rack moves through the machine.

Efficient washing of dishes or other articles requires that the concentration of the controlled solution be not less than a predetermined minimum. Further, the concentration should not be unnecessarily high as this is wasteful and may lead to objectionable results affecting both machine and dishes as well.

The concentration of detergent in the wash solution 10 is diminished in the operation of the machine. Some of the solution is lost as spray, and some is carried out by the articles washed. The solution is also diluted by rinse water, and there is loss through overflow. Fresh water is also supplied as needed and this dilutes the solution. To compensate for these losses the solution has to be replenished with the detergent compound employed. The replenishment should be sufficient to maintain the necessary working strength or concentration without waste, or making the solution too concentrated.

The dispenser herein disclosed as embodying what now appears to be a preferred form of the invention, comprises a gas filled tube circuit 20 controlled by a Wheatstone bridge 21, having in one branch thereof a conductivity cell 22 immersed in solution 10, a reservoir or supply tank 23 containing a supply of the chemical detergent compound and a controller 24 responsive to the output of the circuit, to effect delivery of chemical to the controlled solution or to shut off such delivery as the controlled solution requires.

For convenience of feeding chemical it is preferred that a concentrated solution of the detergent chemical be charged into the storage tank as required. A concentrated solution can be conveniently fed to the controlled solution by displacement, that is by running water into the container in amount sufficient to cause the solution to overflow into a feed pipe 25 which carries the solution into solution 10 of the machine. This displacement water is turned on or off by controller 24, comprising a valve 26 in a supply pipe 27 operated by a solenoid 28 which is energized or de-energized in accordance with the functioning of circuit 20 as affected by the conductivity cell 22 in the Wheatstone bridge 21. The rate of flow of water into tank 23 while valve 26 is open can be adjusted by means of a manually operated valve 29. The displacing water dilutes the stock in tank 23. If the solution becomes too dilute the concentration of the controlled solution 10 will decrease below the desired value. Tube circuit 20 will respond to this condition and energize solenoid 28 whereby feeder valve 26 opens. This valve will remain open and the overflow from tank 23 into the machine will further reduce the concentration of solution 10. When the solution concentration decreases to a predetermined low value, an alarm relay 31 in the tube circuit is operated to cause an alarm or signal 32 to indicate that the concentration of solution has fallen to a point indicating that the supply of concentrated solution in tank 23 has been exhausted or that the feeder is not functioning. Inspection will show whether valve 26 is open, and if it is, the operator or attendant will know or should know that feeder tank 23 requires a charge of the detergent chemical. Signal 32 will remain on until the condition indicated has been corrected.

Circuit 20 is provided preferably with a gas filled tetrode tube 33 having a relay 34 in its plate circuit which, when energized, closes contacts 35 and establishes an energized circuit for solenoid 28 of valve 26. The circuit also includes a gas filled tetrode tube 36 having in its plate circuit the signal relay which, when energized to close its contacts 37, operates the signal 32 to indicate that the concentration of the chemical in solution 10 has decreased to such a low point that the feeder should be examined to determine whether or not concentrated chemical is to be charged into it or whether it is operating or not.

Tetrodes 33 and 36 may each be of the type known as "RCA 2050" or "RCA 2051" and are operable on low alternating current voltage of about 110 volts.

Tube 33 has a plate 38, a heater 39, an indirectly heated cathode 40, an auxiliary control or shield grid 41, and a control grid 42. The auxiliary grid 41 and the cathode 40 are connected together as shown, while control grid 42 has a grid bias resistor 43 in circuit therewith. Tube 36 being similarly constructed, corresponding elements are indicated by the same reference characters with primes affixed thereto.

The plates 38 and 38' are connected to an input terminal 45 of the alternating current supply voltage, and the auxiliary grids and cathodes 41, 40 and 41' and 40' are connected at different points on a potentiometer or voltage-dividing resistor 46. Resistor 46 is connected directly across the input conductors 45 and 47 of the alternating current voltage supply source. For convenience of illustration, resistor 46 is divided into sections 48, 49, and 50, respectively. The auxiliary grid 41 and cathode 40 are connected at a point between resistor sections 49 and 50, while the corresponding elements 41' and 40' of tube 36 are connected between resistor sections 48 and 49.

In the circuit thus far described, resistors 43 and 43' have high ohmic value of the order of a megohm and the resistance value of resistor 48 is high compared to that of resistors 49 and 50. I have found that the circuit operates reliably and efficiently when resistor 48 has a resistance of about 1500 ohms, and resistors 49 and 50, about 100 ohms each. It will be apparent that the auxiliary grid 41 will have more negative bias than the corresponding grid of tube 36.

If the fixed negative grid bias on tubes 33 and 36 is about 4 to 5 volts, the tubes do not pass current, and if the grids are made more positive than this they pass current.

The operating characteristics of gas filled tubes are affected by aging and plate voltage fluctuations. A new tube or one whose characteristics have not changed through use, will pass plate current when a minimum positive grid voltage is applied to the grid. As the tube ages, higher positive grid voltages are required to cause the tube to pass current. Also, fluctuating line voltages to which the plate circuits of such tubes are connected affect the operation of the tubes if the control grid voltage is near the minimum value required to cause flow of plate current. Such factors as tube aging and fluctuating line voltage for the plate circuit would adversely affect the operation of my dispenser. To offset these adverse factors, I employ a step-up transformer 52 which amplifies the small out-put voltage of the Wheatstone bridge to a value sufficiently higher than the minimum voltage normally required to be applied to the control grid of the gas filled tube when the tube is not affected by age and the plate line voltage is substantially constant.

In the circuit shown, the out-put voltage of bridge 21 as amplified by transformer 52, is supplied to control grids 42 and 42'. When the out-put voltage of the Wheatstone bridge results from the concentration of solution 10 being below the desired or controlled value, this voltage as amplified is applied to the control grids 42 and 42'. The amplification is of such order that the control tube 33 passes current and the control valve 26 is opened. Because of the amplification of the bridge output voltage, the circuit is sensitive to a slight reduction in the concentration of controlled solution 10 from the controlled concentration. Likewise, if the concentration of solution 10 increases slightly above the controlled concentration, the out-put voltage of bridge 21 is amplified, but as the polarity is negative, the grid 42 is made sharply negative. Therefore tube 33 ceases to pass current on a slight deviation of solution 10 in a direction higher than the controlled value. Thus tube 33 will have rather sharp on and off control points with the result that the concentration of solution 10 will be held closely to the control point thereof.

By amplifying the grid voltage as above described the control voltage for grid 42 is always sufficiently in excess of the minimum value required for an un-aged tube operating on substantially constant plate voltage, so that tube aging and line voltage fluctuations in the plate circuit will not adversely affect the sensitivity of the control system so long as the tube is in an operating condition.

The above also applies to the alarm or signal tube 36. This tube is given more fixed negative bias so that it does not pass current until the concentration of solution 10 has decreased substantially below the control point of the solution. As the concentration is restored, this tube stops passing current at a concentration below the controlled point so as not to give false alarms or signals.

The primary winding 53 of the transformer is connected across the output terminals of bridge 21 and the secondary winding 54 is connected in circuit with control grids 42 and 42' of the tetrodes 33 and 36. The turns of the secondary winding 54 are substantially greater in number than the turns of the primary winding in order that the aforesaid high control grid voltage may be applied to grids 42 and 42'. In practice I have found that when the ratio of turns of the respective secondary and primary windings 54 and 53 are of the order of about 80 to 1 there is adequate amplification of the bridge output voltage. Thus, for example, an out-put of 0.01 volt at the output terminals of bridge 21 is stepped up or amplified in the secondary winding 54 to a value of about 0.80 volt. By employing a step-up transformer to amplify the control voltage applied to the control grid 42 of the solution control tube, the circuit is substantially independent of such factors as line voltage fluctuations and changing tube characteristics, because the likelihood of transformer 52 undergoing a change in its characteristics are remote. Secondary winding 54 is connected in such fashion to control grids 42 and 42' that tube 33 will be rendered operative to pass plate current as soon as the concentration of chemical in solution 10 falls a small fraction of a percent below the desired minimum operating value and open the feeder valve 26. If the concentration continues to decrease after valve 26 has been opened, the amplified grid voltage of transformer 52 will increase to a value at which tube 36 passes plate current thus operating signal 32 as an alarm or a warning that either the detergent feeder is not operating or the charge of concentrated solution in tank 23 has been consumed and requires replenishment.

Secondary winding 54 has one terminal connected to input supply terminal 47 and the other or opposite terminal connected to control grid 42 through its resistor 43. Thus if input conductor 47 is regarded as negative at any instant the terminal of the transformer connected to resistor 43 and grid 42 will be positive. The control grid 42' is connected to an intermediate tap 57 of winding 54 so that if the terminal of the winding connected to input conductor 47 is regarded as negative and the opposite terminal as positive, the potential at the tap 57 will be less positive. When the controlled solution 10 has decreased in concentration below the desired controlled value, the potential of winding 54 at its point of connection to grid 42 will become positive, current will flow in its plate circuit, and the control relay 34 will close its contacts and effect energization of solenoid 28, thereby opening valve 26. Water will then flow into the container 23 and displace chemical solution into the controlled solution 10. If the concentration of solution 10 is not brought up to the desired value, but instead continues to decrease, the bias on grid 42 will become still more positive, until the potential of the center tap 57 applies sufficiently positive voltage to grid 42' to cause current to flow in the plate circuit of tube 36 thereby energizing relay 31, and causing the signal 32 to operate for the purpose heretofore described.

Operating voltage for the Wheatstone bridge 21 is supplied by a transformer 59, having its primary winding 60 (preferably of low impedance) connected across supply conductors 47 and 45, and its secondary winding 61 (preferably of high impedance) connected across the input terminals 62 and 63 of the bridge. The secondary winding supplies an input voltage of about 3 to 5 volts to the bridge. The output voltage of the bridge varies from about zero at balance to a maximum equal to about the value of the input voltage. The out-put voltage of the bridge is amplified in the ratio of about 80:1 so that a volt out-put results in about 80 volts across winding 54 and 40 volts to the tap 57. While I have indicated a ratio of turns of the secondary to the primary windings of about 80:1 it will be apparent that the ratio may be lower so long as the grid voltage supplied thereby is automatically in excess of the minimum requirements to offset line voltage fluctuations and changing tube characteristics.

Bridge 21 has resistors 64 and 65 in one branch both of which may be fixed in a system designed to perform the functions herein described, and an adjustable resistor 66 and the conductivity cell 22 in the other branch. Resistor 66 may be adjusted so that the value of the controlled concentration in solution 10 may be preset as desired.

Cell 22 comprises a pair of electrodes 69 and 70, which are insulated from each other by means of insulators 71 and 72. Electrodes 69 and 70 are connected in one arm or branch of the Wheatstone bridge by means of terminals 73 and 74, respectively. Terminal 73 is electrically connected to electrode 69 by means of a metallic bushing 75, disposed within the bore of member 69 and secured thereto by means of a set screw 76. As shown, bushing 75 is spaced from the connection of terminal 73 to electrode 70. Terminal 73 is soldered in an annular groove in the bushing 75.

The electrode 70 and insulating member 71 are secured rigidly to member 69 by means of a tension rod 77 that extends through the bore of member 69 in spaced relation thereto, and the insulator 72, and a nut 78 threaded onto the tie-rod 77. The nut 78 is drawn up tightly so that the assembled parts are held together in their proper relationship. The joint between the insulator 71 and the adjacent end of member 69 is made fluid-tight by means of an annular or ring-like gasket 80. Likewise the joint between the head of electrode 70 and the recess in member 71 in which it is seated is made fluid-tight by means of an annular or ring-like gasket 81. The end of the electrode 70 in contact with solution 10 is preferably formed as a spherical cavity 82, for reasons explained in my co-pending application referred to herein. The end of insulator 71 in which electrode 70 is mounted projects beyond the surface 82 and the inner surface of this projecting portion is made substantially spherical, substantially as a continuation of the surface 82, as indicated at 83.

The particular cell 22 illustrated forms the subject matter of my patent application Serial # 51,663 filed on even date herewith, now Patent No. 2,525,754, in which the cell is particularly described and claimed.

The cell 22 is provided with clamp bushings 85 and 86, by means of which it may be operatively mounted on the washer 11, with member 69 projecting into the solution. Bushing 85 is inserted through an opening in a wall of washer compartment 11 from the inside thereof and bushing 86 is threaded into it from the outside until the flange of bushing 85 and a gasket 87 carried therein are pulled up tightly against the opposite faces of the wall. Member 69 is then screwed into bushing 85, pipe threads 88 being provided for that purpose.

When the cell is submerged in solution 10, it having been connected in the bridge as shown and voltage applied to the bridge, current will flow from or to surface 82, to or from electrode 69, through the intervening solution as a conductor or conducting medium, the resistance of which varies with the concentration of chemical in solution 10.

If it be assumed that solution 10 has been made up to the strength desired in the washer and adjustable resistor 66 of the bridge has been adjusted so that no current flows in the plate circuit of tube 33, then it will be apparent that the bridge will become unbalanced if the concentration of the solution decreases below the desired value. When this occurs, the voltage output of the bridge will be in such a direction and amplified to such a value by transformer 52 that the terminal of winding 54, to which control grid 42 is connected, is rendered sufficiently positive to cause current to flow in the plate circuit of tube 33. In response to this current flow relay 34 is energized, its contacts are closed, solenoid 28 energized, and valve 26 opened. Water flowing from pipe 27 into chamber or tank 23 will cause concentrated detergent solution to overflow into pipe 25, to the solution in tank or compartment 11. The concentrated solution will continue flowing until the resistance path between electrode surface 82 and electrode 69 is such that the bridge is restored to balance or to a condition at which the output voltage from the bridge will be in a direction to cause tube 33 to cease passing current. The control circuit will continue to function as above described so long as sufficient concentrated solution is available in the feeder tank 23. If it is neglected to replenish this feeder and the bridge circuit responds to a deficient concentration in the solution 10 and opens valve 26, the concentration of solution 10 will continue to decrease thereby further unbalancing the bridge in the direction of low concentration. Consequently the center tap 57 on transformer winding 54 will become sufficiently positive to cause tube 36 to pass plate current. When this happens, relay 31 is energized, its contacts closed, and the signal 32 operates. Signal 32 may be an an alarm device or a signal light as indicated. Upon restoring the solution in the feeder tank to its proper strength, the concentration of solution 10 will increase to normal, at which time relays 33 and 36 are de-energized and the feed of chemical shut off.

From the foregoing description it will be apparent to those skilled in this particular art that various modifications and changes may be made in the dispenser embodying the invention without departing either from the spirit or the scope thereof, as indicated by the appended claims.

What I claim as new and desire to secure by Letters Patent is:

1. A dispenser for feeding chemical to an aqueous solution in amounts sufficient to maintain a predetermined concentration of said chemical therein comprising a gas filled space current tube having plate and grid circuits adapted for connection to a source of alternating current voltage, said tube being normally biased to zero plate current but passing current when the grid voltage exceeds the trip voltage thereof, a Wheatstone bridge having in one of its branches a conductivity cell adapted to be immersed in said aqueous solution, the resistance to current flow through the cell varying with the concentration of water-soluble chemical therein, said bridge having input terminals disposed for connection to a source of alternating current voltage, means connected to the output voltage terminals of said bridge for amplifying said output voltage and supplying the same to said grid circuit in accordance with the direction of bridge unbalance, said output voltage being amplified to a value materially higher than the voltage normally required to cause the tube to pass current, a feeder for feeding chemical to the solution to be controlled, means actuated in response to current flow in said plate circuit for causing said feeder to feed chemical, the feeder operating to feed chemical when the bridge is unbalanced in one direction and the output voltage thereof is of a polarity corresponding to the solution concentration being below a predetermined value and to shut off feed when the bridge is unbalanced in the opposite direction and the output voltage thereof is of a polarity corresponding to the solution concentration being above said predetermined value and means responsive to an output voltage of said bridge corresponding to a predetermined low chemical concentration in said aqueous solution for indicating that such low concentration has been reached.

2. A dispenser according to claim 1 characterized by the fact that the means connected to the output voltage terminals of said Wheatstone bridge is a transformer having its primary winding connected to the output voltage terminals of the bridge and one terminal of its secondary winding connected to the cathode side of the plate circuit and its other terminal to the control grid of said tube, the turns in the secondary winding being greater in number than the turns in the primary winding by an amount sufficient to amplify the output voltage of the bridge to a value substantially in excess of the value normally required to cause said tube to pass current when the tube characteristics have not been changed by aging.

3. A dispenser according to claim 1 characterized by the fact that the tube is a tetrode having an indirectly heated cathode and an auxiliary grid connected thereto and a fixed negative bias resistor in series therewith, and a control grid connected thereto and a fixed negative bias resistor in series therewith, and a control grid connected to the voltage supply means connected to the output voltage terminals of said bridge.

4. A dispenser according to claim 1 characterized by the fact that control grid voltage supply means is a voltage step-up transformer having its primary winding connected to the output voltage terminals of said Wheatstone bridge and having one terminal of its secondary winding connected to the cathode side of said plate circuit, and the gas filled tube is a tetrode having an auxiliary grid, a control grid and an indirectly heated cathode, the auxiliary grid and cathode being connected together and in series with a fixed negative bias resistor, the control grid of said tube being connected to the other terminal of the secondary winding of said transformer, the turns in the secondary winding of said transformer being sufficient in number to amplify the control grid voltage to a value substantially in excess of the voltage normally required to cause said tube to pass current.

5. A dispenser according to claim 1 characterized by the fact that control grid voltage supply means is a transformer having its primary winding connected to the output voltage terminals of said Wheatstone bridge and having one terminal of its secondary winding connected to the cathode side of said plate circuit, and the tube is a pentode having an auxiliary grid, a control grid and an indirectly heated cathode, the control grid and cathode being connected together and in series with a fixed negative bias resistor, the control grid of said resistor being connected in series with a resistor having a resistance value of the order of a megohm to the other terminal of the secondary winding of said transformer, the turns in the secondary winding of said transformer being sufficient in number to amplify the control grid voltage to a value substantially in excess of the voltage normally required to cause said tube to pass current.

6. A dispenser according to claim 1 characterized by the fact that the chemical feeder comprises a storage vessel having a concentrated aqueous solution of the chemical to be fed, said vessel having an inlet adapted for connection to a supply of water and an overflow outlet from which said concentrated solution discharges to the controlled aqueous solution when water flows into said vessel, a solenoid operated valve in said water inlet, and a relay having a coil energized by current in said plate circuit and a contactor actuated by said coil for connecting said solenoid to a source of operating voltage, said solenoid valve being open when the bridge output voltage is of a polarity corresponding to the concentration of the controlled solution being below a predetermined value and closed when said concentration is of a predetermined high value.

7. A dispenser according to claim 1 characterized by the fact that a resistor of relatively high ohmic value is provided and adapted for connection across the source of voltage for the plate circuit, and that said tube is provided with an auxiliary grid connected to its cathode and to said resistor at such a potential point as will provide a fixed negative bias sufficient to prevent flow of current in the plate circuit, that the control grid of said tube is connected to grid voltage supply means connected to the output voltage terminals of the Wheatstone bridge, and that the means for indicating low concentration of chemical in the aqueous solution comprises a second gas filled space-current tube having its plate circuit connected in parallel with the plate circuit of said first-mentioned tube, said second tube having a control grid and an auxiliary bias grid and cathode, said auxiliary grid and cathode being connected together and to said resistor at a point where the potential is more positive than the potential of the point to which the auxiliary grid and cathode of the first tube are connected and that the control grid of said second tube is connected to said grid voltage supply means at a lower positive potential point than that to which the control grid of the first tube is connected, and an electric signal in the plate circuit of said second tube, said second tube passing plate current and operating said signal when the bridge output voltage is of a value corresponding to a concentration in the controlled solution that is lower than the concentration at which the first tube passes current in its plate circuit.

8. A dispenser according to claim 1 characterized by the fact that a resistor of relatively high ohmic value is provided and adapted for connection across the source of voltage for the plate circuit, and that said tube is provided with an auxiliary grid connected to its cathode and to said resistor at such a potential point as will provide a fixed negative bias sufficient to prevent flow of current in the plate circuit, that the control grid of said tube is in circuit with grid voltage supply means connected to the output voltage terminals of the Wheatstone bridge, and that the means for indicating the low concentration of said aqueous solution comprises a second gas filled tube having its plate circuit connected in parallel with the plate circuit of said first mentioned tube, said second tube having a control grid and an auxiliary bias grid and cathode, said auxiliary grid and cathode being connected together and to said resistor at a point where the potential is more positive than the potential of the point to which the auxiliary grid and cathode of the first tube are connected and that the control grid of said tube is connected to said grid voltage supply means at a lower positive potential point than that to which the control grid of the first tube is connected, and a resistor having a resistance of the order of a megohm is connected in series with the control grid of each of said tubes, and a signal device in the plate circuit of said second tube, said second tube passing plate current and energizing said signal device when the bridge output voltage is of a value corresponding to a concentration in the controlled solution that is lower than the concentration at which the first tube passes current in its plate circuit.

9. A dispenser according to claim 1 characterized by the fact that a resistor of relatively high ohmic value is provided and adapted for connection across the source of voltage for the plate circuit, and that said tube is provided with an auxiliary grid connected to its cathode and to said resistor at such a potential point as will provide a fixed negative bias sufficient to prevent flow of current in the plate circuit, and that the means for indicating the low concentration in said aqueous solution comprises a second gas filled tube having its plate circuit connected in parallel with the plate circuit of said first mentioned tube, said second tube having a control grid and an auxiliary bias grid and cathode, said auxiliary grid and cathode being connected together and to said resistor at a point where the potential is more positive than the potential of the point to which the auxiliary grid and cathode of the first tube are connected, that the grid control voltage supply means comprises a transformer having primary and secondary windings the turns of the secondary winding being substantially greater in number than the turns of the primary winding, said primary winding being connected to the output voltage terminals of the Wheatstone bridge, and the secondary winding having one terminal connected to the resistor at a potential point which is more negative than the point at which the auxiliary and control grid of said first tube are connected, the opposite terminal of said secondary winding being connected to the control grid of said first-mentioned tube, said secondary winding having a tap intermediate its terminals connected to the control grid of said second-mentioned tube, and that a signal device is connected in circuit with the plate of said second vacuum tube, said signal device being energized by plate current of the second tube when the bridge output voltage corresponds to a concentration in the controlled solution that is lower than the concentration at which the first tube passes current in its plate circuit.

KURT ALBRECHT.

REFERENCES CITED

The following references are of record in the file of this patent:

UNITED STATES PATENTS

| Number | Name | Date |
| --- | --- | --- |
| 1,912,997 | Parker | June 6, 1933 |
| 2,004,569 | Davis | June 11, 1935 |
| 2,176,471 | Pyle | Oct. 17, 1939 |
| 2,221,306 | Christie | Nov. 12, 1940 |
| 2,299,529 | Crampton | Oct. 20, 1942 |
| 2,377,363 | Noble | June 5, 1945 |
| 2,393,701 | Moyer | Jan. 29, 1946 |
| 2,456,811 | Blackburn | Dec. 21, 1948 |
| 2,468,678 | MacKenzie | Apr. 26, 1949 |
| 2,508,973 | Smith | May 23, 1950 |